US010422629B2

(12) United States Patent
Haverkamp et al.

(10) Patent No.: US 10,422,629 B2
(45) Date of Patent: Sep. 24, 2019

(54) METHOD AND APPARATUS FOR DETERMINING A PLURALITY OF SPATIAL COORDINATES ON A MEASUREMENT OBJECT

(71) Applicant: CARL ZEISS INDUSTRIELLE MESSTECHNIK GMBH, Oberkochen (DE)

(72) Inventors: Nils Haverkamp, Aalen (DE); Tobias Held, Noerdlingen (DE); Dominik Seitz, Schwaebisch Gmuend (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 293 days.

(21) Appl. No.: 15/426,436

(22) Filed: Feb. 7, 2017

(65) Prior Publication Data
US 2017/0234676 A1 Aug. 17, 2017

(30) Foreign Application Priority Data

Feb. 15, 2016 (DE) .................. 10 2016 102 579

(51) Int. Cl.
*G01B 11/00* (2006.01)
*G01B 5/008* (2006.01)
(Continued)

(52) U.S. Cl.
CPC ............ *G01B 11/007* (2013.01); *G01B 5/008* (2013.01); *G01B 7/008* (2013.01);
(Continued)

(58) Field of Classification Search
CPC ...... G01B 11/007; G01B 5/008; G01B 7/008; G01B 9/02055; G01B 11/005;
(Continued)

(56) References Cited

U.S. PATENT DOCUMENTS 4,908,951 A * 3/1990 Gurny .................. G01B 11/005
33/1 M
5,033,856 A * 7/1991 Nose ....................... G01B 11/24
250/201.2
(Continued)

FOREIGN PATENT DOCUMENTS

CN 103988049 A 8/2014
EP 2 486 369 B1 12/2014
(Continued)

*Primary Examiner* — Justin Seo
*Assistant Examiner* — Tania C Courson
(74) *Attorney, Agent, or Firm* — Harness, Dickey & Pierce, P.L.C.

(57) ABSTRACT

A method and an apparatus for determining a plurality of spatial coordinates on a measurement object using a working head having an image sensor for recording images of the measurement object. A first image of a first feature of the object with the working head in a first working position is recorded. First spatial coordinates representing a spatial position of the first feature are determined using first position information of the working head supplied by an encoder arrangement. The working head is then moved relative to the object to a second working position, where a second image of the object is recorded. Using the first and the second images, second position information which represents a spatial offset of the working head relative to the object is determined. Spatial coordinates for a second feature of the measurement object are determined on the basis of the second position information.

11 Claims, 3 Drawing Sheets

(51) Int. Cl.
*G01B 7/008* (2006.01)
*G01B 9/02* (2006.01)
*G01B 11/02* (2006.01)
*G01B 11/03* (2006.01)
*G01B 11/04* (2006.01)
*G01B 21/04* (2006.01)

(52) U.S. Cl.
CPC ........ *G01B 9/02055* (2013.01); *G01B 11/005* (2013.01); *G01B 11/026* (2013.01); *G01B 11/03* (2013.01); *G01B 11/04* (2013.01); *G01B 21/045* (2013.01); *G01B 21/047* (2013.01)

(58) Field of Classification Search
CPC ....... G01B 11/026; G01B 11/03; G01B 11/04; G01B 21/045; G01B 21/047
USPC .................. 33/502–503, 550–551, 553–554
See application file for complete search history.

(56) References Cited

U.S. PATENT DOCUMENTS

| | | | | |
|---|---|---|---|---|
| 5,359,416 A * | 10/1994 | Mueller | ............. | G01N 21/9515 356/446 |
| 6,181,422 B1 * | 1/2001 | Veltze | ................. | G01B 11/026 250/201.3 |
| 6,396,589 B1 * | 5/2002 | Ebihara | ................. | G01B 11/24 356/601 |
| 7,230,721 B2 * | 6/2007 | Christoph | .............. | G01B 11/00 356/601 |
| 8,627,576 B2 * | 1/2014 | Engel | ................... | G01B 21/047 33/503 |
| 9,234,736 B2 * | 1/2016 | Engel | ..................... | G01B 7/012 |
| 9,684,149 B2 * | 6/2017 | Winterot | ................ | G02B 9/34 |
| 9,982,987 B2 * | 5/2018 | Mayinger | ................ | G01B 5/28 |
| 10,113,851 B2 * | 10/2018 | Ooyama | ................ | G01B 5/0014 |
| 2012/0246953 A1 | 10/2012 | Engel | | |
| 2014/0259715 A1 * | 9/2014 | Engel | ................... | G01B 11/007 33/503 |
| 2015/0049186 A1 * | 2/2015 | Pettersson | ............ | G01B 21/047 348/135 |
| 2019/0107378 A1 * | 4/2019 | Meile | ................... | G01B 21/042 |

FOREIGN PATENT DOCUMENTS

EP         2899501 A1    7/2015
WO    2014/023332 A1    2/2014

* cited by examiner

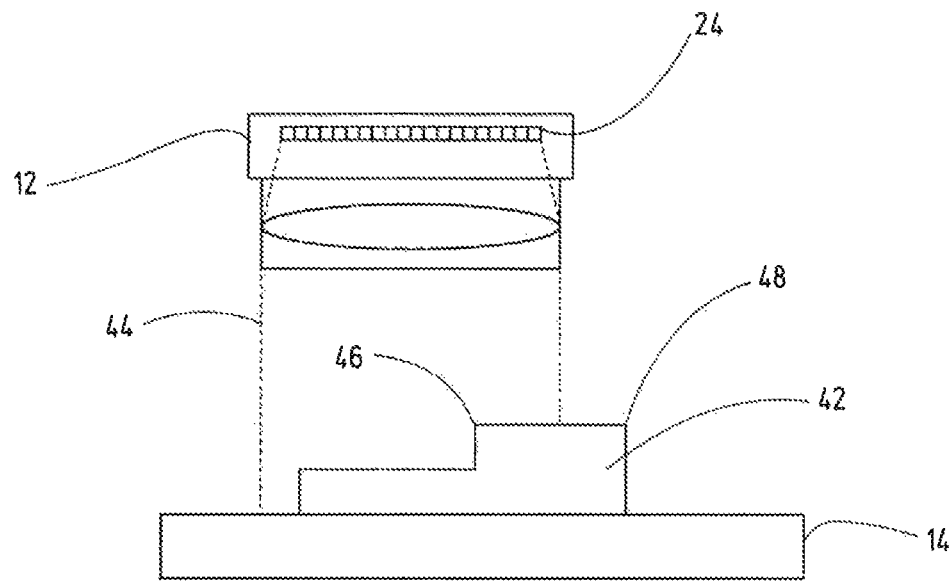
Fig.2
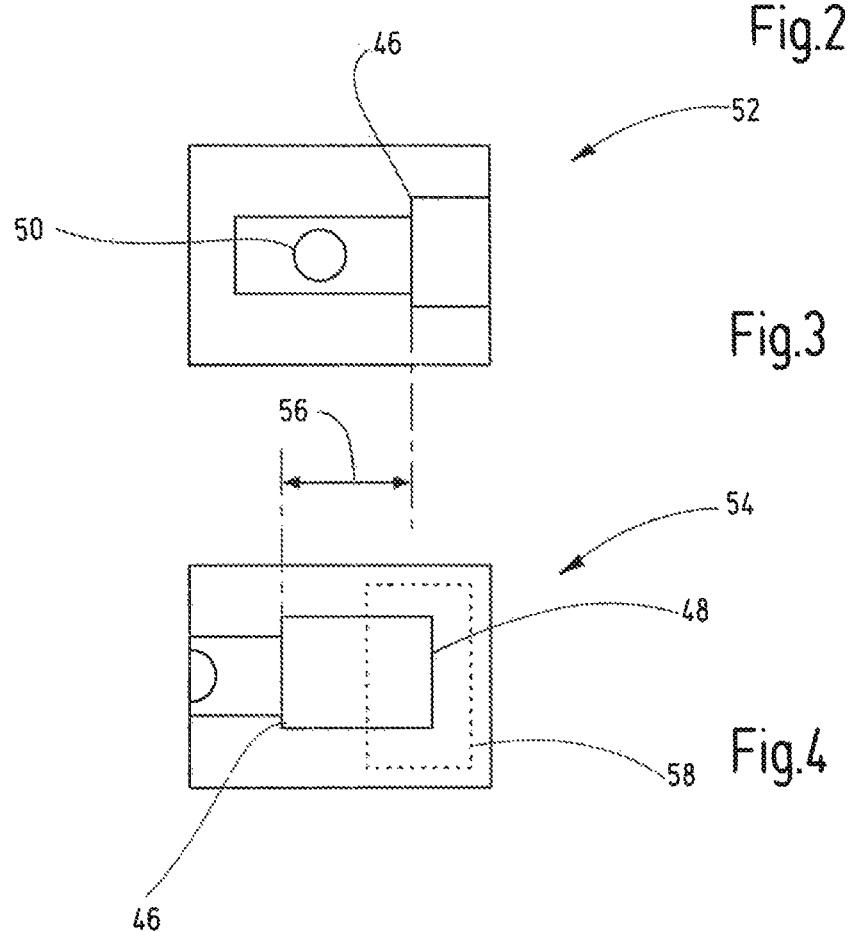
Fig.3
Fig.4

METHOD AND APPARATUS FOR DETERMINING A PLURALITY OF SPATIAL COORDINATES ON A MEASUREMENT OBJECT

CROSS-REFERENCES TO RELATED APPLICATIONS

This application claims priority under § 119 from German patent application DE 10 2016 102 579.9 filed on Feb. 15, 2016. The entire content of this priority application is incorporated herein by reference.

BACKGROUND OF THE INVENTION

The present invention relates to a method and an apparatus for determining a plurality of spatial coordinates on a measurement object having a plurality of measurement features. Such a method is often carried out using what is known as a coordinate-measuring machine and, accordingly, the present invention particularly relates to a method and an apparatus involving a coordinate-measuring machine. However, the invention is not limited to conventional coordinate-measuring machines. It can likewise advantageously be implemented using one or more robots or any other machine structures allowing to displace a measurement object and a working head relative to each other.

WO 2014/023332 discloses a coordinate-measuring machine having a measurement head which carries an optical sensor. The measurement head is displaceable relative to a workpiece table such that it can be moved into various measurement positions relative to a measurement object. The respective working position of the measurement head relative to the workpiece table is determined by way of encoder arrangements which have linear scales along the movement axes of the measurement head or of the workpiece table.

The accuracy with which the measurement head can be positioned relative to the measurement object on the workpiece table influences the measurement accuracy with which the measurement object can be measured. For this reason, highest possible positioning accuracy is desirable. The same is true for the working head of a machine tool or a robot for processing an object. Generally, the positioning accuracy of a machine working head depends on many factors, especially on the accuracy and the stability of the mechanical guides, on the accuracy of the linear scales and on the accuracy of the encoder arrangement with which the position of the working head within the working space is typically determined. realization of such components becomes more complex with rising accuracy requirements.

In order to achieve high positioning accuracy of a working head, typically a heavy machine construction is required. This frequently runs counter to the desire to realize high accelerations of the working head for a fast performance of the working process. For this reason, the engineer for an apparatus having a moving working head must frequently strike a compromise which limits the maximum positioning accuracy that is possible. Furthermore, ageing, wear, temperature variations and other environmental conditions may cause the positioning accuracy of a working head to be limited and/or to decrease over time.

It is a known procedure to determine positioning errors of a coordinate-measuring machine during what is referred to as a calibration for selected working positions and to correct the corresponding positioning errors during the working process by way of calculation. However, any correction of this kind means extra outlay and can be optimum merely for selected working positions.

EP 2 486 369 B1 discloses a coordinate-measuring machine having a tactile sensor which can be moved along three mutually orthogonal coordinate axes. Again, the respective working position of the tactile sensor is determined using linear scales. Moreover, the described coordinate-measuring machine has a plurality of change-in-location sensors which provide acceleration data for the tactile sensor. According to an exemplary embodiment, the data of the linear scales can be reconciled with the data of the change-in-location sensors. This permits plausibilization and furthermore additionally a correction of position information which are determined using the linear scales. However, the known coordinate-measuring machine requires the additional change-in-location sensors, which constitutes a disadvantage for some applications.

SUMMARY OF THE INVENTION

Against this background, it is an object of the present invention to provide a method and an apparatus of the type mentioned at the outset, with which a highly accurate position determination is possible in an efficient manner.

According to an aspect of the present invention, there is provided a method for determining a plurality of spatial coordinates on a measurement object having a plurality of features, the method comprising the steps of providing a working head having an image sensor which is configured to record an image of the measurement object, arranging the object at a selected position within a working space in which the working head can move relative to the measurement object, providing a coordinate system having a number of coordinate axes, providing an encoder arrangement configured to supply first position information, the first position information representing a respective working position of the working head along at least one of the coordinate axes, moving the working head relative to the measurement object to a first working position, recording a first image of the measurement object using the image sensor, with a first feature from the plurality of features being measurably imaged in the first image, determining first spatial coordinates representing a spatial position of the first feature using the first position information, moving the working head relative to the measurement object to a second working position, recording a second image in which a second feature from the plurality of features is measurably imaged, evaluating the first and the second images in order to determine second position information which represents a spatial offset of the working head relative to the measurement object, and determining second spatial coordinates representing a spatial position of the second feature using the second position information.

According to another aspect, there is provided an apparatus for determining a plurality of spatial coordinates on a measurement object having a plurality of features, the apparatus comprising a working head having an image sensor configured to record an image of the measurement object, comprising a holder for arranging the measurement object at a selected position within a working space in which the working head can move relative to the measurement object, comprising a coordinate system having a number of coordinate axes, comprising an encoder arrangement configured to supply first position information, wherein the first position information represents a respective working position of the working head along at least one of the coordinate axes, comprising a drive mechanism for moving the working head relative to the measurement object, and comprising an evaluation and control unit, wherein evaluation and control unit is configured to move, by way of the drive mechanism, the working head to a first working position relative to the measurement object, wherein evaluation and control unit is further configured to record a first image of the measurement object using the image sensor at the first working position such that a first feature from the plurality of features is measurably imaged in the first image, wherein evaluation and control unit is further configured to determine, using the first position information, first spatial coordinates which represent a spatial position of the first feature, wherein evaluation and control unit is further configured to subsequently move the working head, using the drive mechanism, to a second working position relative to the measurement object, wherein evaluation and control unit is further configured to record a second image in which a second feature from the plurality of features is measurably imaged using the image sensor, wherein the evaluation and control unit is further configured to determine, using the first and the second images, second position information which represents a spatial offset of the working head relative to the measurement object, and wherein evaluation and control unit is further configured to determine second spatial coordinates which represent a spatial position of the second feature using the second position information.

The novel method and the novel apparatus each combine first position information, which is obtained by way of the encoder arrangement along at least one of the coordinate axes and thus indicates an absolute position in the coordinate system, with second position information, which is obtained by way of the image sensor and relates to a previously determined working position relative to the object. The second position information is consequently relative position information, which provides an indication of the absolute position in the coordinate system only together with the first position information. While the second position information is obtained using the image sensor, it represents the working position of the working head and is processed correspondingly. In the preferred exemplary embodiments, the encoder arrangement includes linear scales and/or rotary encoders which provide a position information along at least one coordinate axis in a manner known per se. The linear scales and/or rotary encoders alone may also supply relative position information, such as with incremental scales, but their evaluation using the encoder arrangement here results in the indication of an absolute position along the at least one coordinate axis, specifically independently of whether or not the working head is moved relative to an object to be measured. The encoder arrangement can supply the first position information even if no object is present in the working space. By contrast, the second position information does require the presence of an object to be measured in the working space. The encoder arrangement preferably supplies the first position information along three mutually orthogonal coordinate axes, i.e. the first position information represents a position in a three-dimensional working space.

The image sensor in the preferred refinements supplies a two-dimensional image. In the known coordinate-measuring machines that employ an image sensor for determining spatial coordinates on an object, it is by using the image sensor that the position of an object feature (or a plurality of object features) in a coordinate system is typically determined. The spatial coordinates of the feature in the coordinate system are gathered here from the first position information, which represents the working position of the working head, and the image information, which includes the position of the feature relative to the working head. The measurement accuracy with which the spatial coordinates for a selected feature are determined therefore for each individual feature depends on the measurement accuracy with which the current position of the working head within the working space is determined on the basis of the first position information.

The novel method and the corresponding apparatus, in contrast, use—at least additionally—the relative second position information to determine the current position of the working head. The second position information is here not obtained from the encoder arrangement, but is determined on the basis of the spatial offset that is shown by a feature in the second image when compared to the first image on the basis of the displacement of the working head between the image recordings. The second position information in particular thus represents the spatial offset of the working head relative to the object starting from the first working position which is known due to the first position information. The offset can be in any direction within the coordinate system.

The position of the working head when recording the second image therefore results from the relative displacement of the working head, which is determined in preferred exemplary embodiments merely on the basis of the comparison between the first and the second image. Next, spatial coordinates are determined for the second feature using the thusly obtained second position information. These spatial coordinates are obtained from the displacement of the working head relative to the object and—if a reference to the coordinate system is desired—from the (first) spatial coordinates of the first feature.

The measurement accuracy with which the spatial coordinates for the second feature can be determined can be increased over traditional methods and apparatuses in an inexpensive manner, because the measurement accuracy of an imaging sensor is frequently greater than the measurement accuracy that is achieved along one or more coordinate axes with known encoder arrangements. Consequently, the novel method and the corresponding apparatus permits a cost-effective realization with a high measurement accuracy, in particular if the image sensor is the "main sensor" of the working head and is therefore present already. The novel method and the corresponding apparatus thus advantageously use information of the image sensor to determine not only the position of an object feature relative to the working head, but also to determine the position of the working head itself within the working space.

The novel method and the corresponding apparatus are particularly advantageous if no metrologically supported correction values are available for the second working position and instead interpolation between metrologically captured supporting points must be used. Moreover, the novel method and the corresponding apparatus can inexpensively provide a very high measurement accuracy for relative references between object features, such as the spacing between two holes or edges on the object. The above-mentioned object is therefore achieved completely.

In a preferred refinement of the invention, the second position information is determined on the basis of a selected feature from the plurality of features, wherein the selected feature is imaged in the first and in the second image.

Alternatively or additionally, the second position information can in further refinements be determined on the basis of a reference object which does not form a feature of the object. The preferred refinement has the advantage that the image sensor can be aligned in optimum fashion with the object, independently of any reference object. Furthermore, the available working space is not limited by a separate reference object. On the other hand, the use of a reference object may be advantageous if the object has low contrasts.

In a further refinement, the selected feature is the first feature.

This refinement permits a highly efficient determination of the spatial coordinates, because the first feature is already being measured. Moreover, this refinement has the advantage that the second position information relates directly to the first feature, which permits a very high measurement accuracy with respect to the spatial relationships among the object features.

In a further refinement, the second feature is measurably imaged only in the second image.

In this refinement, the second feature is not contained in the first image or at least is not imaged sufficiently sharply and/or with enough contrast to allow a direct determination of the spatial coordinates for the second feature on the basis of the first image. This refinement permits a large measurement region and a flexible determination of spatial coordinates for a plurality of spatially distributed features on an object.

In a further refinement, a parameter data set is provided, which represents at least one of the following parameters: a defined working position within the working space, a defined path length within the working space, a defined trajectory within the working space, a current temperature in the region of the working space, and an elapsed time period relative to a defined reference time, wherein the second position information is used in dependence on the parameter data set for determining the second spatial coordinates.

In this refinement, optionally the first (absolute) position information or the second (relative) position information is used to determine the spatial coordinates for the second feature. This selection is made in dependence on the parameter data set, which represents one or more of the previously mentioned parameters.

In some advantageous exemplary embodiments, the second position information is used in dependence on the parameter data set if the defined path length of the working head between the first and the second working position is small with respect to the maximum dimensions of the working space, for example is less than 20% and preferably less than 10% of the maximum path length along the at least one coordinate axis. In this case, the relative second position information is thus preferred in the case of small movement strokes of the working head, whereas the absolute first position information is preferred in the case of large movement strokes.

In further refinements, the relative second position information is used if the defined trajectory, along which the working head is moved from the first working position to the second working position, exceeds defined threshold values with respect to the movement speed and/or acceleration of the working head.

In further refinements, the relative second position information is used if the current temperature in the region of the working space deviates from a reference temperature by more than a defined threshold value. The reference temperature advantageously represents a current temperature in the region of the working space at the time of the determination of correction values which serve for correcting the first position information. In these refinements, the relative second position information is thus used if the current temperature in the region of the working space differs noticeably from the working temperature during the capturing of the calibration values.

In further refinements, the second position information is used if the time period relative to the defined reference time exceeds a defined threshold value, in particular if a defined time period has elapsed since the last calibration of the encoder arrangement for the first position information.

The above-mentioned refinements and exemplary embodiments permit a highly flexible adaptation of the novel method and the corresponding apparatus to the individual environmental conditions and measurement tasks. The control parameters for moving the working head can advantageously be matched adaptively to changed environmental situations and/or properties of the apparatus and/or of the object. In some preferred exemplary embodiments, the first and the second position information is used with a weighting that is dependent on the parameter data set to determine spatial coordinates on the object and/or to move the working head to further working positions.

In a further refinement, the second spatial coordinates are verified using the first position information. Alternatively, the second position information can be used in other refinements without verification using the first position information for determining the spatial coordinates for the second feature.

In the preferred refinement, plausibilization and/or a weighted synthesis or correction of the second position information on the basis of the first position information is carried out, wherein the latter in this case refer to the second working position of the working head. Since the encoder arrangement in principle provides first position information for any possible working position of the working head within the working space, this refinement advantageously uses absolute first and relative second position information to minimize the measurement uncertainty.

In a further refinement, the first position information is corrected using the second position information.

In this refinement, the second position information is used to determine current correction values that represent static and/or dynamic measurement errors of the encoder arrangement for the first position information and correspondingly permit correction of the first position information. In some preferred exemplary embodiments, the correction values are stored in a non-volatile memory of the apparatus and are used as the current correction values for the subsequent movements of the working head. These exemplary embodiments thus permit an adaptive "online correction" of guidance errors.

In a further refinement, movement parameters for moving the working head relative to the object are determined in dependence on the second position information, wherein the working head is moved, in dependence on the movement parameters, to further working positions relative to the object in order to determine further spatial coordinates.

In this refinement, the second position information replaces and/or complements the first position information in the position control of the working head for further operation. In other words, the working head in this refinement is initially moved to the first working position using the first position information. Subsequently, the working head is moved to the second working position by way of the first position information. By contrast, subsequent movement strokes of the working head are effected using the second position information in the sense of a "coupling navigation". In some exemplary embodiments, the first position information merely provides a starting point from which the movements of the working head are controlled, in the sense of a "coupling navigation", only on the basis of the second position information. The refinement permits a very high positioning accuracy in the case of small movement strokes, in particular in working environments with varying temperatures or other environmental conditions.

In a further refinement, a further image of the object is recorded and, in dependence on the further image, a region of interest containing the second feature is determined for the second image before the working head reaches the second working position. In some advantageous exemplary embodiments, the further image can be made available by a further image sensor which has a different viewing angle than the first image sensor.

In this refinement, the region of interest containing the second feature is predicted in dependence on current information. The further image can in principle also be the first image, i.e. the location of the region of interest for the second feature is predicted on the basis of information from the first image. The refinement permits a faster determination of the spatial coordinates for the second feature.

It is understood that the aforementioned features and those yet to be explained below may be used not only in the respectively specified combination but also in other combinations or on their own, without departing from the scope of the present invention.

BRIEF DESCRIPTION OF THE DRAWINGS

Exemplary embodiments of the invention are shown in the drawing and are explained in greater detail in the following description. In the figures:

FIG. 2 shows a simplified illustration of a working head with an image sensor and an object, FIG. 3 shows a first image which was recorded using the image sensor from FIG. 2, FIG. 4 shows a second image of the object from FIG. 2.

DESCRIPTION OF PREFERRED EMBODIMENTS

Figure 1:
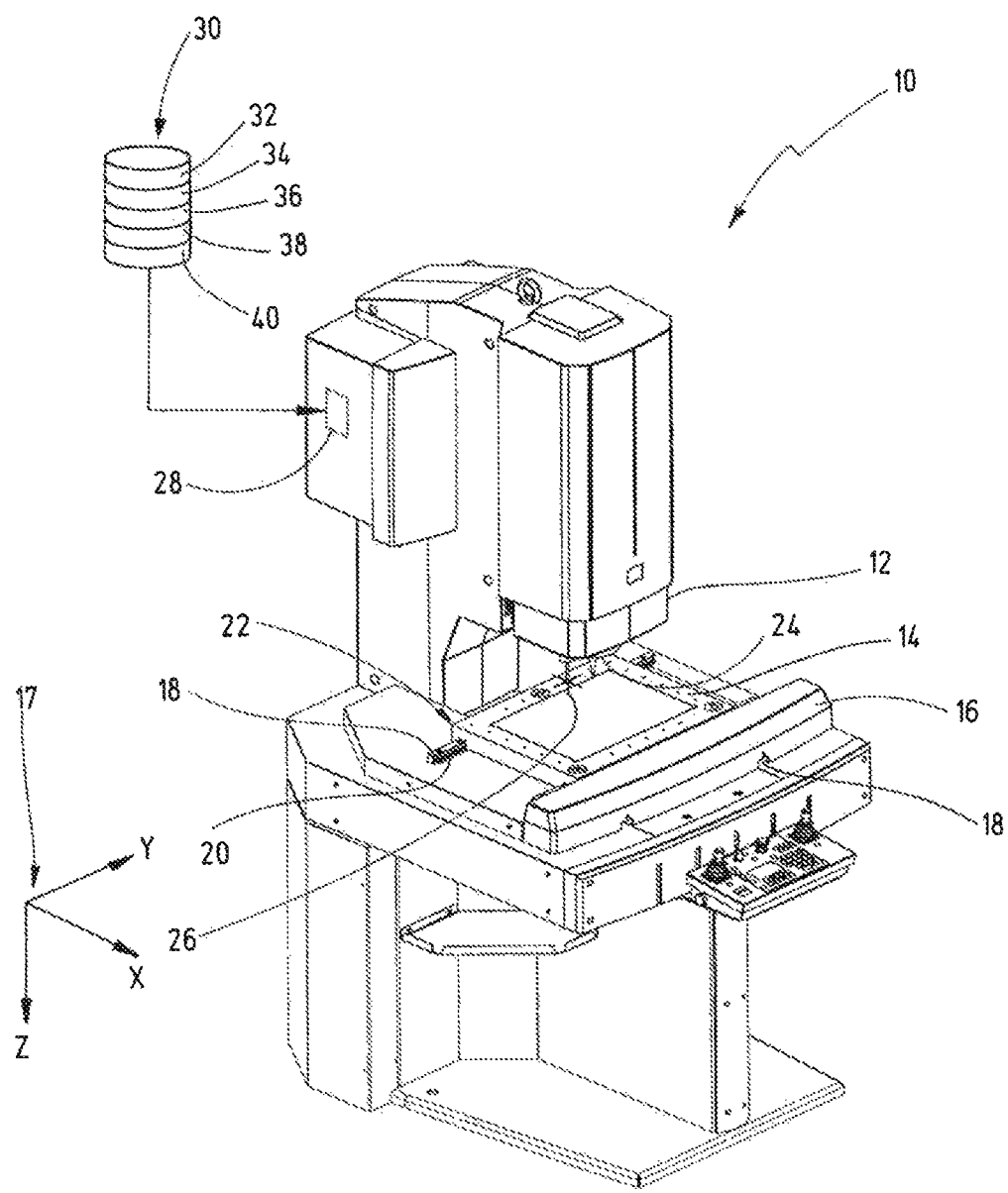
FIG. 1 shows a coordinate-measuring machine according to an exemplary embodiment of the present invention.

In FIG. 1, an exemplary embodiment of the novel apparatus in the form of a coordinate-measuring machine as a whole is designated with the reference numeral 10. The coordinate-measuring machine 10 is here selected as an example of a plurality of suitable apparatuses which are not limited to coordinate-measuring machines within a narrow meaning of the term, such as those having a portal or stand construction. In addition, the novel method and the corresponding apparatus can in principle also be advantageously used during the processing of objects. Moreover, the novel method and the corresponding apparatus are not limited to systems having serial kinematics corresponding to the exemplary embodiments described below. For example, the working head, which is movable relative to an object, could be arranged on a parallel kinematics construction or on a multiaxial robot arm. It is likewise possible for the working head to be stationary by itself, while the object can be positioned relative to the working head by way of a suitable kinematic construction including one or more robots. The implementation of the novel method in a coordinate-measuring machine having an optical sensor, however, is particularly cost-effective and therefore advantageous.

The coordinate-measuring machine 10 has a working head 12, which in the present case is arranged, at a pillar, above a workpiece table 14. The workpiece table 14 is configured for receiving an object (not illustrated here), which is to be measured using the working head 12. Typically coordinate-measuring machines are used to determine dimensional properties of objects, in particular as part of quality assurance and/or prototyping.

In this exemplary embodiment, the workpiece table 14 is what is known as a cross table, what can be moved along two mutually orthogonal spatial directions via suitable drives 16 (not visible here). The two spatial directions are frequently referred to as x-axis and y-axis, and they define together with a third orthogonal axis (z-axis) a machine coordinate system, which is illustrated here with the reference numeral 17. The workpiece table 14 here has linear guides 18, which permit linear movement along the coordinate axes.

Typically arranged in the region of at least one of the guides 18 in each coordinate direction is a linear scale 20, which together with a read head (not illustrated separately here) forms an encoder arrangement 22. The encoder arrangement 22 provides in a manner known per se first position information which represents—at least after corresponding evaluation—a respective working position of the working head 12 and of the workpiece table 14 in absolute coordinates of the coordinate system 17. In simplified fashion, only the encoder arrangement along the y-axis is designated in FIG. 1. However, the apparatus 10 advantageously has a multidimensional encoder arrangement which provides absolute position information along the three coordinate axes. Accordingly, the working head 12 is displaceable on a guide along the z-axis (not illustrated here) via a drive system which is integrated in the pillar.

Arranged on the working head 12 is an optical sensor having an integrated image sensor 24. As will be explained in more detail below with respect to FIGS. 2 and 4, the image sensor 24 permits the recording of an image of an object that is positioned on the workpiece table 14. The coordinate-measuring machine 10 in this preferred exemplary embodiment also has a tactile sensor 26, which is likewise arranged on the working head 12. The coordinate-measuring machine 10 thus permits the measurement of an object selectively using the image sensor 24 and/or the tactile sensor 26. In other exemplary embodiments, a processing tool could be arranged on the working head 24 in place of the tactile sensor 26.

The reference numeral 28 designates an evaluation and control unit, which is configured to control the movements of the working head 12 relative to the workpiece table 14 and to determine the respective working position of the working head 12 in the machine coordinate system 17. Moreover, in some exemplary embodiments, the evaluation and control unit 28 is configured to determine spatial coordinates on an object to be measured, wherein it uses the (first) position information that is provided by the encoder arrangement 22 along the coordinate axes. The evaluation and control unit furthermore uses information that is made available by the image sensor 24 and/or the tactile sensor 26 for the determination of the spatial coordinates, as is known in principle to experts in the field.

In some exemplary embodiments, the novel apparatus and the corresponding method use a non-volatile memory, in which a parameter data set 30 is stored. In preferred exemplary embodiments, the parameter data set 30 includes a defined working position 32, a defined path length 34, a defined trajectory 36, a temperature parameter 38 and a defined time duration 40, or at least one or more of these parameters. In some exemplary embodiments, spatial coordinates on an object are determined in dependence on the parameter data set, selectively on the basis of the (absolute) position information, which is determined using the encoder arrangement 22, and/or on the basis of second position information, which is determined using the image sensor 24. Accordingly, the image sensor 24 is advantageously used to determine, in addition to the first position information of the encoder arrangement 22, further position information that represents a current working position of the working head 12 relative to the workpiece table 14 and thus allows the determination of spatial coordinates on an object.

FIG. 2 shows the optical sensor having the integrated image sensor 24 in a simplified illustration. Identical reference signs designate the same elements as before. By way of example, an object 42 is arranged on the workpiece table 14. As indicated in FIG. 2, the object 42 is here larger than the image recording region 44 of the image sensor 24, with the result that only part of the object 42 may be imaged on an image. The object 42 has a plurality of features, as for example the object edges 46, 48, and a hole 50 (see FIG. 3).

FIG. 3 shows a first image 52 of the object 42, which was recorded using the image sensor 24. As is shown in FIG. 3, the features 46, 50 are depicted here, but not the feature 48.

FIG. 4 shows a second image 54 of the object 42, which was recorded with the image sensor 24 after the working head 12 was displaced relative to the object 42. The displacement of the working head 12 relative to the object 42 corresponds to the offset 56 by which the object edge 46 in the second image 54 is displaced relative to the object edge 46 in the image 52. It is possible by way of a comparison of the images 52, 54 to determine the offset 56 and consequently (second) position information that represents the spatial offset of the working head 12 relative to the object 42.

The reference numeral 58 here designates a region of interest which contains the object edge 48 that is imaged on the image 54. In some preferred exemplary embodiments, the location of the region of interest 58 in the second image 54 is already determined before the working head 12 has reached the working position for recording the second image 54, for example by predicting the location of the region of interest 58 on the basis of CAD data and/or the information that was obtained using the first image 52.

Figure 5:
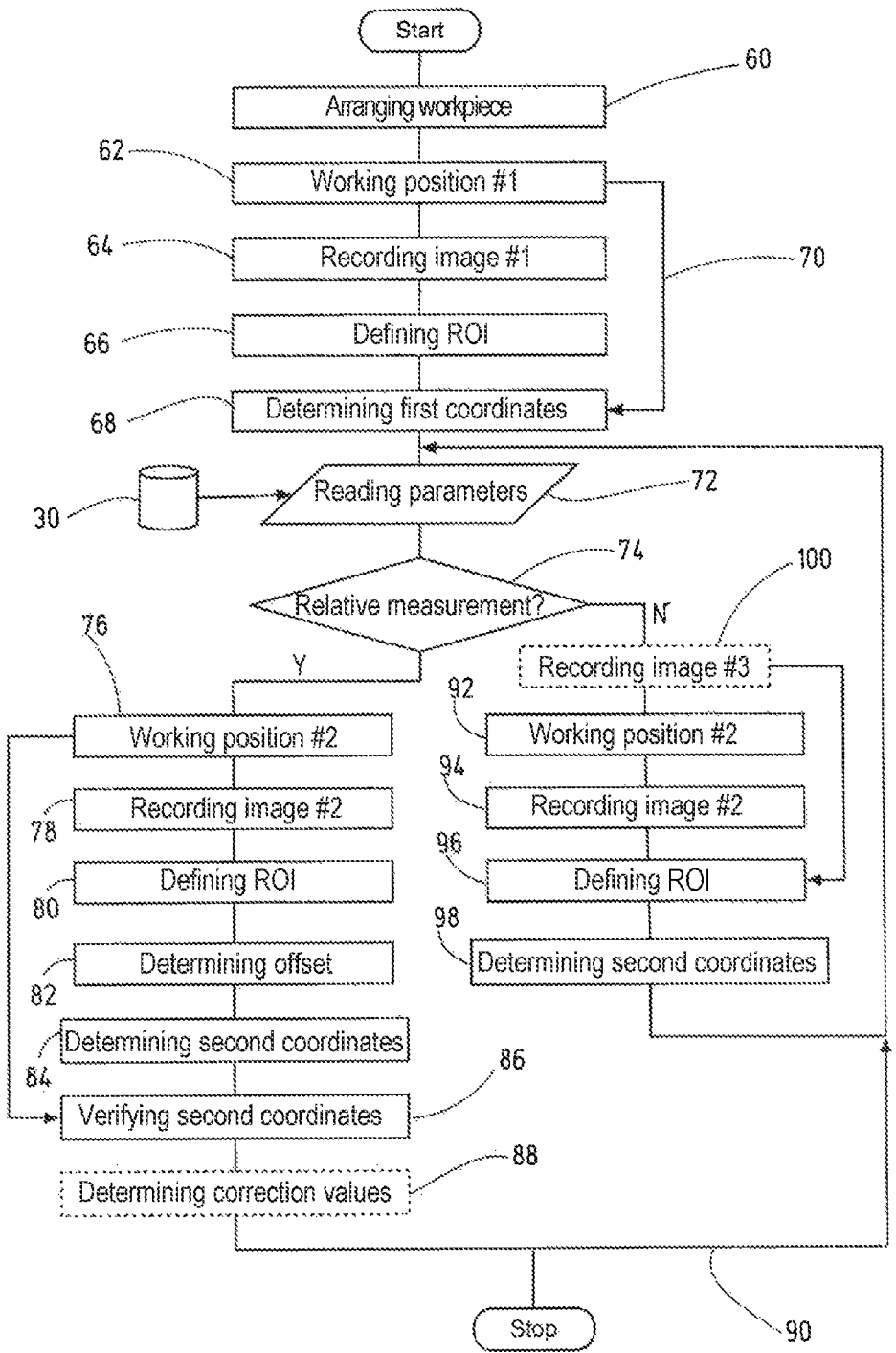
FIG. 5 shows a flowchart for explaining an exemplary embodiment of the novel method.

An exemplary embodiment of the novel method will be explained below with reference to FIG. 5. According to step 60, the object 42 to be measured is initially arranged on the workpiece table 14. According to step 42, the working head 12 is brought to a first working position, and a first image is recorded according to step 64 (cf. FIG. 3). According to step 66, a region of interest in the first image is defined, which contains a first feature, for example the object edge 46. The region of interest serves for reducing the number of image points to be evaluated in a manner known per se in order to accelerate the evaluation.

According to step 68, first spatial coordinates are determined that represent the position of the selected feature, such as the object edge 46, in the coordinate system 17 or an equivalent coordinate system. In a manner known per se, first position information that is made available by the encoder arrangement 22 along the coordinate axes of the coordinate-measuring machine 10 is used for determining the first spatial coordinates, as is indicated at the reference numeral 70.

In step 72, one or more parameters are read from the memory 30, and based on this, a decision is made in step 74 as to whether the further measurement steps should be performed (only) on the basis of further (first) position information, which is made available by the encoder arrangement 22, or whether alternatively or additionally relative (second) position information should be used that is determined using the image sensor 24.

In some preferred exemplary embodiments, a relative measurement of the spatial coordinates on further object features is carried out if the movement path for the working head 12 relative to the object 42 is less than a defined threshold value and/or if a current temperature in the region of the working space exceeds a defined threshold value and/or is within or outside a defined temperature interval and/or if a defined time period was exceeded since the last calibration. According to step 76, the working head is moved to a second working position and, according to step 78, a second image is recorded which corresponds to, for example, the image 54 from FIG. 4. According to step 80, the region of interest 58 is defined and, according to step 82, the offset 56 is determined, which represents the movement of the working head 12 relative to the object 42. According to step 84, second spatial coordinates are then determined, which represent for example the position of the object edge 48 in the coordinate system 17. As has already been mentioned further above, the second spatial coordinates 84 for the object edge 48 (second feature) are determined here "relatively" on the basis of the offset 56 and on the basis of the known spatial coordinates for the first feature 46.

In some exemplary embodiments, the second spatial coordinates are verified, according to step 86, on the basis of first position information that is made available by the encoder arrangement 22. In some exemplary embodiments, correction values can be determined, according to step 88, with which the first position information of the encoder arrangement 22 can be corrected if the spatial coordinates for the second feature, which were determined using the first position information, deviate from the spatial coordinates that were determined using the offset 56. According to step 90, further measurement cycles can be carried out, wherein in some exemplary embodiments, a decision is made selectively, on the basis of the parameters from the memory 30, as to whether the relative measurement should be carried out according to the steps 76 to 84 or whether instead the further coordinates on the object should be determined "absolutely" by way of the first position information of the encoder arrangements.

The latter alternative is illustrated by way of the steps 92, 94, 96, 98. According to step 92, the working head is moved to the second (or further) working position, and according to step 94, a second (or further) image of the object is recorded. According to step 96, a region of interest is defined, which contains the feature to be measured. According to step 98, the second (or further) coordinates for the selected feature in the region of interest are determined by using the first position information of the encoder arrangement 22 in a manner known per se. It is to be understood that even in this case the position of the selected feature is determined in the recorded image, because the first position information merely represents the working position of the working head in the coordinate system 17 and thus a relationship between the working head 12 and the feature to be measured still needs to be established on the basis of the recorded image. In contrast to the alternative described previously, the encoder arrangements now supply the primary position information for the determination of the working position.

In some exemplary embodiments, a further image can be recorded according to step 100 in order to define the region of interest even before the working head has reached the second or further working position. This variant is possible in principle even in the case of the "relative" measurement based on the steps 76 to 84.

According to the previous description, the novel method and the corresponding apparatus thus combine first position information, which represents an absolute position within the coordinate system 17, with relative second position information, which is determined advantageously using an optical sensor, the first working position of which is initially assumed by way of the encoder arrangements. In some preferred exemplary embodiments, the further measurement of the object takes place on the basis of the second position information. In other exemplary embodiments, depending on environmental parameters and/or parameters of the measurement task, a selection is made individually concerning which position information is used to determine the coordinates on the object.

The novel method and the corresponding apparatus combine the various pieces of position information in an advantageous manner and can thus obtain, in a cost efficient manner, increased measurement accuracy, because the first position information is typically spread around an (unknown) average, while the second relative position information can have a measurement error which increases linearly as the path length increases, but with typically less dispersion. The combination of the absolute and relative position information permits verification and/or correction of the respectively obtained measurement values.

In some exemplary embodiments, the position control of the working head during movement is effected using the second relative position information. Control parameters for the feedback loops can advantageously be changed in dependence on the application or environment.

In some exemplary embodiments, the absolute first position information and the relative second position information is combined such that the relative second position information is always given priority if small local changes occur within short time periods, whereas the first position information is given priority if position information over larger time periods and/or larger distances is required. Advantageously, a targeted weighting of the first and second position information can be effected in dependence on the spatial and time boundary conditions.

The selection of the sensors which are suitable for the provision of the position information is advantageously effected in the following way:
1. identifying a desired system accuracy, resolution and agility,
2. selecting a primary system for the provision of the position information, especially with respect to a desired long-term stability,
3. identifying speed, acceleration, resolution, spatial domain and/or time intervals that are less suitable for the guiding system for achieving the desired accuracy,
4. selecting alternative systems for the provision of position information that avoids the identified deficit regions of the guiding system,
5. fixing the spatial, speed, acceleration, resolution, spatial domain and/or time intervals, within which the systems from step 4 are to provide the primary position information, and
6. determining suitable filter curves for the synthesis of the position information of the individual systems.

What is claimed is:

1. A method for determining a plurality of spatial coordinates on a measurement object having a plurality of features, the method comprising the steps of:
   providing a working head having an image sensor which is configured to record an image of the measurement object,
   arranging the object at a selected position within a working space in which the working head can move relative to the measurement object,
   providing a coordinate system having a number of coordinate axes,
   providing an encoder arrangement configured to supply first position information, the first position information representing a respective working position of the working head along at least one of the coordinate axes,
   moving the working head relative to the measurement object to a first working position,
   recording a first image of the measurement object using the image sensor, with a first feature from the plurality of features being measurably imaged in the first image,
   determining first spatial coordinates representing a spatial position of the first feature within the coordinate system using the first position information supplied by the encoder arrangement representing the position of the working head in said first working position,
   moving the working head relative to the measurement object to a second working position,
   recording a second image in which a second feature from the plurality of features is measurably imaged,
   evaluating the first and the second images in order to determine second position information which represents a spatial offset of the working head in said second working position relative to said first working position, and
   determining second spatial coordinates representing a spatial position of the second feature within the coordinate system using the second position information.

2. The method according to claim 1, wherein the second position information is determined on the basis of a selected feature from the plurality of features, wherein the selected feature is imaged in the first image and in the second image.

3. The method according to claim 2, wherein the selected feature is the first feature.

4. The method according to claim 1, wherein the second feature is measurably imaged only in the second image.

5. The method according to claim 1, further comprising a step of providing a parameter data set which represents at least one of the following parameters: a defined working position within the working space, a defined path length within the working space, a defined trajectory within the working space, a current temperature in the region of the working space, and an elapsed time period relative to a defined reference time, wherein the second position information is used in dependence on the parameter data set for determining the second spatial coordinates.

6. The method according to claim 1, wherein the second spatial coordinates are verified on the basis of the first position information from the encoder arrangement.

7. The method according to claim 1, wherein correction values for the first position information are determined based on the second position information.

8. The method according to claim 1, wherein movement parameters for moving the working head relative to the measurement object are determined in dependence on the second position information.

9. The method according to claim 8, wherein the working head is moved, in dependence on the movement parameters, to a further working position relative to the measurement object in order to determine further spatial coordinates.

10. The method according to claim 1, wherein a further image of the measurement object is recorded prior to the second image, and wherein, in dependence on the further image, a region of interest containing the second feature is determined for the second image before the working head reaches the second working position.

11. An apparatus for determining a plurality of spatial coordinates on a measurement object having a plurality of features, the apparatus comprising:
- a working head having an image sensor configured to record an image of the measurement object,
- a holder for arranging the measurement object at a selected position within a working space in which the working head can move relative to the measurement object,
- a coordinate system having a number of coordinate axes,
- an encoder arrangement configured to supply first position information, wherein the first position information represents a respective working position of the working head along at least one of the coordinate axes,
- a drive mechanism for moving the working head relative to the measurement object, and
- an evaluation and control unit,
- wherein the evaluation and control unit is configured to move, by way of the drive mechanism, the working head to a first working position relative to the measurement object,
- wherein the evaluation and control unit is further configured to record a first image of the measurement object using the image sensor at the first working position such that a first feature from the plurality of features is measurably imaged in the first image,
- wherein the evaluation and control unit is further configured to determine first spatial coordinates which represent a spatial position of the first feature within the coordinate system using the first position information supplied by the encoder arrangement representing the position of the working head in said first working position,
- wherein the evaluation and control unit is further configured to subsequently move the working head, using the drive mechanism, to a second working position relative to the measurement object,
- wherein the evaluation and control unit is further configured to record a second image in which a second feature from the plurality of features is measurably imaged using the image sensor,
- wherein the evaluation and control unit is further configured to evaluate the first and second images to determine second position information which represents a spatial offset of the working head in said second working position relative to said first working position, and
- wherein the evaluation and control unit is further configured to determine second spatial coordinates which represent a spatial position of the second feature within the coordinate system using the second position information.

* * * * *